United States Patent [19]

Jackson

[11] Patent Number: 4,934,469
[45] Date of Patent: Jun. 19, 1990

[54] BATHROOM SCALE APPARATUS
[76] Inventor: Allen G. Jackson, Box 91, Bryan, Ohio 43506
[21] Appl. No.: 382,430
[22] Filed: Jul. 20, 1989
[51] Int. Cl.⁵ .......................................... G01G 21/28
[52] U.S. Cl. .................................................. 177/244
[58] Field of Search ........................................ 177/244
[56] References Cited
U.S. PATENT DOCUMENTS
4,800,973  1/1989  Angel .............................. 177/210 C
4,844,189  7/1989  Shisgal et al. .

Primary Examiner—George H. Miller, Jr.
Attorney, Agent, or Firm—Emch, Schaffer, Schaub & Porcello

[57] ABSTRACT

A bathroom scale apparatus is disclosed. The scale apparatus has a bottom surface. A plurality of downwardly extending projections are located on the bottom surface. The projections engage a carpeted surface to provide a stable platform.

13 Claims, 1 Drawing Sheet

BATHROOM SCALE APPARATUS

BACKGROUND OF THE INVENTION

The present invention relates to bathroom scales and specifically to a bathroom scale apparatus having a supporting structure that provides a stable platform for a bathroom scale on both hard surfaces and pile-surfaced carpets or rugs.

Often prior art scales, for accuracy and safety, require a hard surface floor. If placed on a carpet or rug the prior art scales, when mounted by a person desiring to be weighted, give way in a teetering motion of pitch or roll or both. This results in an inaccurate measurement of weight and could be a potential hazard to the user due to the scale instability.

The primary object of the present invention is to provide a scale apparatus which may be placed on either a hard surface or on pile-surfaced carpets or rugs and still maintain an accurate measurement of weight.

SUMMARY OF THE INVENTION

The present invention relates to a bathroom scale apparatus having a top surface, a bottom surface and side surfaces extending upwardly from the bottom surface. A plurality of downwardly extending projections are provided on the bottom surface. The projections are suitable for engaging a carpeted surface to provide a stable platform. In addition, rigid pads are provided adjacent the intersecting sides on the bottom surface for engaging a hard or non-carpeted surface. The multiple rigid downwardly extending projections separate the pile fibers of a carpet to transfer the load to the carpet backing and to the flooring. This uniform transfer of the load to the underlying firm surface provides a stable bathroom scale which tends to eliminate the teetering motion that often occurred in prior art scales when used on a pile-surfaced carpet or rug.

DESCRIPTION OF THE PREFERRED EMBODIMENTS

Figure 1:
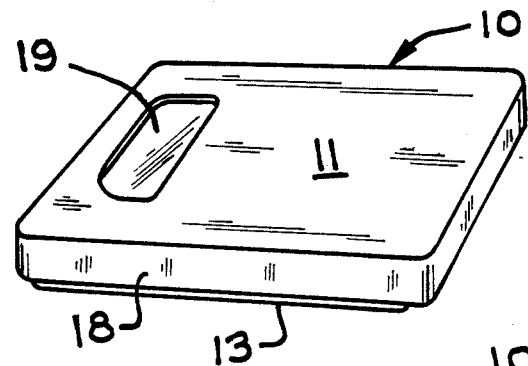
FIG. 1 is a perspective view of a bathroom scale apparatus according to the present invention.

A bathroom scale apparatus, according to the present invention, is generally indicated in FIG. 1 by the reference number 10. The scale 10 includes a top 11, a bottom 12, and intersecting sides 13-16 which extend upwardly from the bottom 12. The top 11 includes a continuous depending flange 18 which overlies the respective sides 13-16 which extend upwardly from the bottom 12. The top 11 also includes a window 19 for reading the weight of the user. The scale mechanism itself may be of various types, either mechanical or electronic, and is not a part of the present invention.

Figure 2:
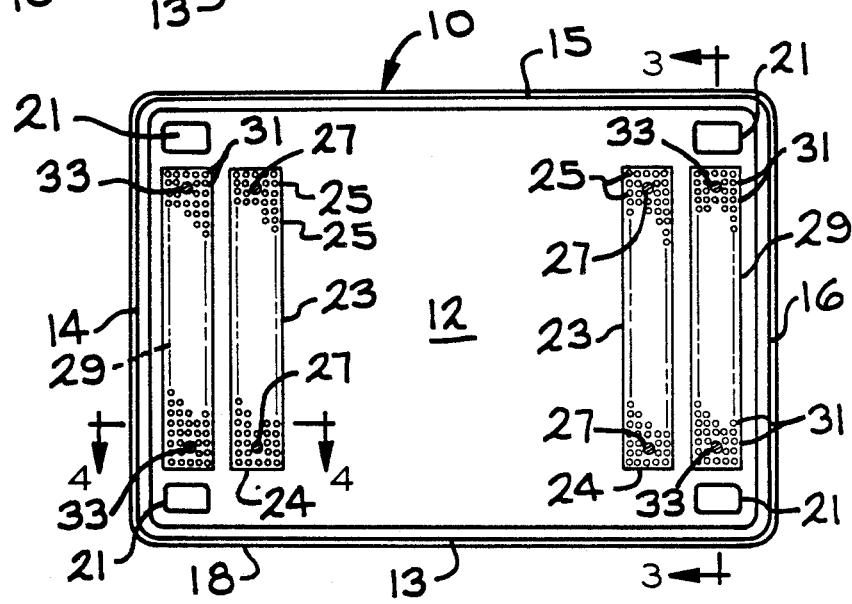
FIG. 2 is an enlarged plan view of the bathroom scale apparatus shown in FIG. 1.
Figure 3:
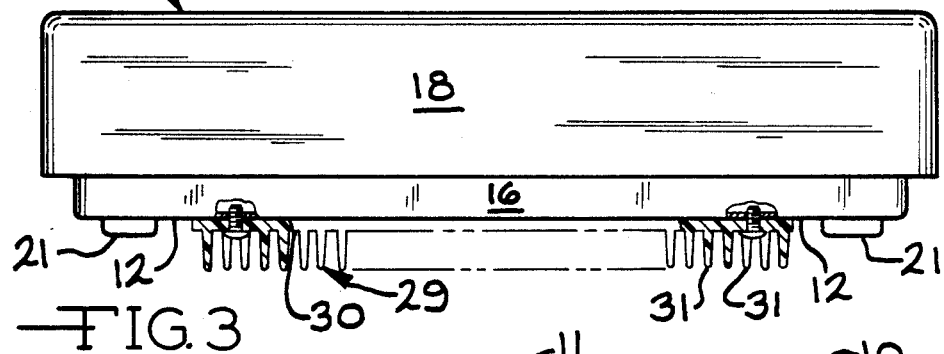
FIG. 3 is an enlarged partially cross-sectional view taken along the line 3—3 of FIG. 2.

Referring to FIGS. 2 and 3, integral rigid pads 21 are located adjacent the intersections of the sides 13-16. Referring to FIG. 3, the rigid pads 21 extend downwardly below the bottom 12 a first distance. In the present embodiment the first distance D is approximately one quarter inch (0.64 cm). However, the first distance may vary and is determined by the application. In the present embodiment the bottom 12 and its integral rigid pads 21 are metallic. However, other materials, such as plastic, may be utilized and fall within the scope of the invention.

Figure 4:
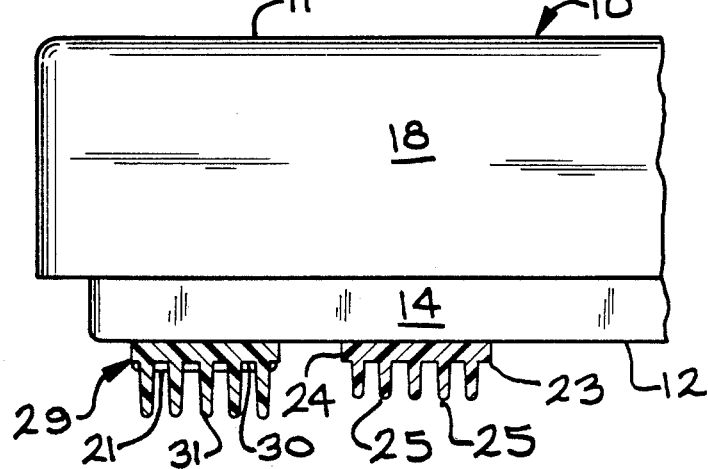
FIG. 4 is a fragmentary, enlarged partially cross-sectional view taken along the line 4—4 of FIG. 2.

A first set of projection pads 23 are removably mounted on the bottom 12 of the bathroom scale apparatus 10. The projection pads 23 include a base 24 and a plurality of projections 25. Referring to FIG. 4, the projections 25 extend downwardly from the bottom 12 of the bathroom scale apparatus 10 a second distance which is greater than the first distance of the rigid pads 21. In the present embodiment, the projections 25 are approximately three-eighths inch (0.97 cm) in length. The projection pads 23 are spaced on opposite sides of the bottom 12 and are removably mounted by fasteners 27, which in the present embodiment are screws.

The multiple rigid downwardly extending projections 25 separate a pile fiber to transfer the load of the scale user to the backing of the carpet or rug and ultimately to the floor structure. Referring to FIGS. 2, 3 and 4, a second set of projection pads 29 are removably mounted on the bottom 12 adjacent the sides 14 and 16 and adjacent respective projection pads 23. The projection pads 29 include a base 30 and a plurality of downwardly extending projections 31. Fasteners 33, in the present embodiment screws, removably secure the second set of projection pads 29 to the bottom 12 of the bathroom scale apparatus 10.

The projections 31 extend downwardly from the bottom 12 a third distance. In the present embodiment the projections 31 are approximately five-eighth inch (1.6 cm) in length.

In use, the embodiment of the bathroom scale apparatus 10, shown in FIG. 2, is placed upon deep piled carpet or rug. In this situation the pair of projection pads 29 are operative for uniformly transferring the load through the pile to the rigid flooring. This provides a stable base for the scale. In addition, the projections 31 engage the pile and backing of the carpeting which tends to make the overall bathroom scale apparatus safer to use.

When the carpeting or rug has a shorter piled surface, the second set of projection pads 29 are removed by removing the fasteners 33. The first set of projections pads 23 with their projections 25 now become operable. Similarly, when the bathroom scale apparatus 10 is placed on a non-carpeted surface, the first set of projection pads 23 are also removed by removing the fasteners 27 and the bathroom scale apparatus is then supported by the rigid pads 21 located in the four corners of the bottom 12 of the bathroom scale apparatus 10.

While the first and second sets of projection pads 23 and 29 are normally constructed of plastic material, other material such as metal may be utilized and still be within the scope of the present invention. Furthermore, different methods of attachment may be utilized to connect the projection pads 23 and 29 to the bottom 12. Differing numbers and configurations of the rigid pads 21 and the sets of projection pads 23 and 29 may also be utilized and still fall within the scope of the present invention.

The number of projections 25 and 31 and the configuration of the bottom 12 and the pads 21, 23 and 29 depends on the style and sizes of the scales involved.

I claim:

1. A bathroom scale apparatus comprising, in combination, a scale body having a top surface, a bottom surface and side surfaces extending upwardly from said bottom surface, said bottom surface having at least four corners, a plurality of downwardly extending projections on said bottom surface, said projections engaging a carpeted surface to provide a stable platform, said plurality of downwardly extending projections including a plurality of projections in each of said corners.

2. A bathroom scale apparatus, according to claim 1, including rigid pads on said bottom surface for engaging a non-carpeted surface.

3. A bathroom scale apparatus, according to claim 2, wherein said rigid pads are an integral part of said scale and are located on said bottom surface adjacent the intersections of said side surfaces.

4. A bathroom scale apparatus, according to claim 2, wherein said plurality of projections extend from projection pads mounted on said bottom surface, each of said projection pads including a base and a plurality of projections extending from said base.

5. A bathroom scale apparatus, according to claim 4, wherein said rigid pads extend below said bottom surface a first distance and said projection pad projections extend below said bottom surface a second distance, said second distance being greater than said first distance.

6. A bathroom scale apparatus, according to claim 4, wherein said projection pads are removably mounted by fasteners to said bottom surface.

7. A bathroom scale apparatus, according to claim 2, including first and second sets of projection pads removably mounted on said bottom surface, said rigid pads extending below said bottom surface a first distance, said first set of projection pads having downwardly extending projections extending below the bottom surface a second distance, said second distance being greater than said first distance, said second set of projection pads having downwardly extending projections extending below said bottom surface a third distance, said third distance being greater than said second distance.

8. A bathroom scale apparatus comprising, in combination, a scale body having a top, a bottom and intersecting sides extending upwardly from said bottom, integral pads extending downwardly from said botom said integral pads being located adjacent the intersections of sides and extending downwardly a first distance from said bottom, at least one removable projection pad positioned on said bottom, said projection pad including a plurality of projections extending downwardly from said bottom a second distance, said second distance being greater than said first distance.

9. A bathroom scale apparatus, according to claim 8, including a first set of projection pads positioned on said bottom and having projections extending downwardly such second distance.

10. A bathroom scale apparatus, according to claim 9, including a second set of projection pads positioned on said bottom and having projections extending downwardly a third distance from said bottom, said third distance being greater than said second distance.

11. A bathroom scale apparatus, according to claim 10, wherein said integral pads are positioned adjacent each intersection of said sides and wherein said first set of projection pads comprises two projection pads positioned adjacent opposite edges of said bottom.

12. A bathroom scale apparatus, according to claim 11, wherein said second set of projection pads comprises two projection pads mounted adjacent opposite edges of said bottom.

13. A bathroom scale apparatus comprising, in combination, a scale body having a top surface, a bottom surface and side surfaces extending upwardly from said bottom surface, a plurality of downwardly extending projections on said bottom surface, said projections engaging a carpeted surface to provide a stable platform, rigid pads on said bottom surface for engaging a non-carpeted surface, and first and second sets of projection pads removably mounted on said bottom surface, said rigid pads extending below said bottom surface a first distance, said first set of projection pads defining downwardly extending projections extending below the bottom surface a second distance, said second distance being greater than said first distance, said second set of projection pads defining downwardly extending projections extending below said bottom surface a third distance, said third distance being greater than said second distance.

* * * * *